INVENTOR.
William B. Buehrle
BY
Mueller, Aichele & Rauner
ATTY'S.

INVENTOR.
William B. Buehrle

BY Spulley, Fickle & Rauner

ATTY'S.

United States Patent Office

Re. 27,810
Reissued Nov. 20, 1973

27,810

TWO-STAGE COMMUNICATION DEVICES HAVING COMBINED CLOCK AND INFORMATION SIGNALS

William B. Buehrle, Phoenix, Ariz., assignor to Motorola, Inc., Franklin Park, Ill.

Original No. 3,510,780, dated May 5, 1970, Ser. No. 584,035, Sept. 12, 1966. Application for reissue July 21, 1971, Ser. No. 164,791
Int. Cl. H04b *1/16*
U.S. Cl. 325—321 6 Claims

Matter enclosed in heavy brackets [ ] appears in the original patent but forms no part of this reissue specification; matter printed in italics indicates the additions made by reissue.

ABSTRACT OF THE DISCLOSURE

An elasped time digital communication system is disclosed wherein both the digital information content and the timing or clock information is represented by the elapsed time for two successive transitions between electrical states. After a first or initiating transition to an active state, each successive transition indicates that information is available. By measuring the time between successive transitions, both information content and timing signals are recovered.

This invention relates generally to digital information communication devices and systems and particularly to those devices and systems wherein a change in electrical states indicates both timing and information to be translated.

In providing digital signals over a communication channel, especially a channel having substantial noise, it is desirable to provide frequent clock or timing signals to ensure synchronization of the receiver and the transmitter. In most systems there is a compromise between the information rate, pass band of the channel, and the furnishing of clocking signals. Generally, the higher the information rate, the greater the requirement is for absolute synchronization between the transmitter and receiver at opposite ends of an information channel. In a channel having high information rates, the drift between the oscillators or other timing mechanisms may be limited to a 0.5% before information is lost or erroneously introduced into the system. In systems employing lower rates of information transfer, the timing tolerances are correspondingly increased.

Prior art communication systems have used coding and signal indicating techniques wherein the direction of the signal or its magnitude is used to indicate information content. For example, in Teletype or teleprinter systems, the mark-space signals are used to convey information and also in some respect provide timing. Such systems are referred to as return-to-zero (RTZ). Such communication systems require that between successive signals indicating information items that the signal return to a zero or reference condition. The space between two successive signals indicating information is therefore unused. Improvements over RTZ are the so-called non-return-to-zero (NRZ) and the non-return-to-zero-change-on-one (NRZ1) schemes. The NRZ and NRZ1 provide an improvement in that there is no return to a reference condition between successive information indicating signals. In the latter systems, wherein the information content of successive signals or digit positions is unchanged, there is no clocking information provided; i.e., there are no changes in electrical states. Some magnetic tape systems, using the NRZ1 code, require phase modulation schemes to provide clocking information. Such devices require complicated and extensive equipments which are not justified in all communication applications. Other communications systems have a three-state signal which consists of a neutral state bounded by two bi-polar conditions for indicating information. Here again, the signal amplitude and polarity indicates information with the three states requiring a wider pass band than that is required for a two state communications system. Also, more costly equipment is required. Yet, other communications systems and devices have resorted to adaptive and self-clocking systems for overcoming noise interference in information channels. Such systems are quite expensive even though they do provide one solution for the clocking and information rate problem.

Therefore, it is an object of this invention to provide a simple, inexpensive and reliable two-state communication device and system which is relatively insensitive to the noise.

It is another object of this invention to provide communication devices which utilize a combined clocking and information signal.

It is a further object of this invention to provide communication devices and systems having independent operating timing elements with the system design permitting a large variation in timing elements from station to station and yet provide reliable communications.

A communication system using this invention has the feature that all transitions between two signal states except the first and last occuring transitions indicate both timing and availability of information. Also each bit of information requires such a transition.

Referring now to the accompanying drawing, wherein.

According to this invention, information to be transmitted through an information channel is represented by elapsed time between two successive transitions between electrical states in the system, for example mark and space potentials in a telegraph or teleprinter system. The successive transitions provide timing or clock information as well as indicating that information is indicatable. After a first or initiating transition between a reference state to an active state, each succesive transition indicates that information is available. The time between successive transitions are then measured. For example, in a binary system, a first elapsed time, for example, one millisecond, may represent a binary zero. A second and greater period of elapsed time, for example one and one-half milliseconds, may represent a binary one. The end of the message is indicatable by an elapsed time equal to two milliseconds, for example. All the transitions intermediate the initial transition and the transition immediately following an elapsed time of two milliseconds indicate information and also provide synchronization.

The above described wave may be generated by selectively toggling a two-state counter, such as a flip flop, on a variable time basis to provide successive transitions between mark and space potentials or electric states. Such a wave is detected or decoded by sensing such transitions and utilizing timing devices for measuring the time between successive transitions, and indicating such elapsed time as a reproduction of such binary information. The transitions are also used as clock pulses in the receiver. The end of message (EOM) two millisecond elapsed time is used to automatically deactivate the receiver. By using the above method, as many digits or bits of binary information may be transmitted in one message as one pleases. With each bit of information, also including clocking information, the length of the message will never adversely affect operating reliability. For convenience, the message may be broken into units of five bits with successive units of five bits being transmitted as a unitary message.

Figure 1:
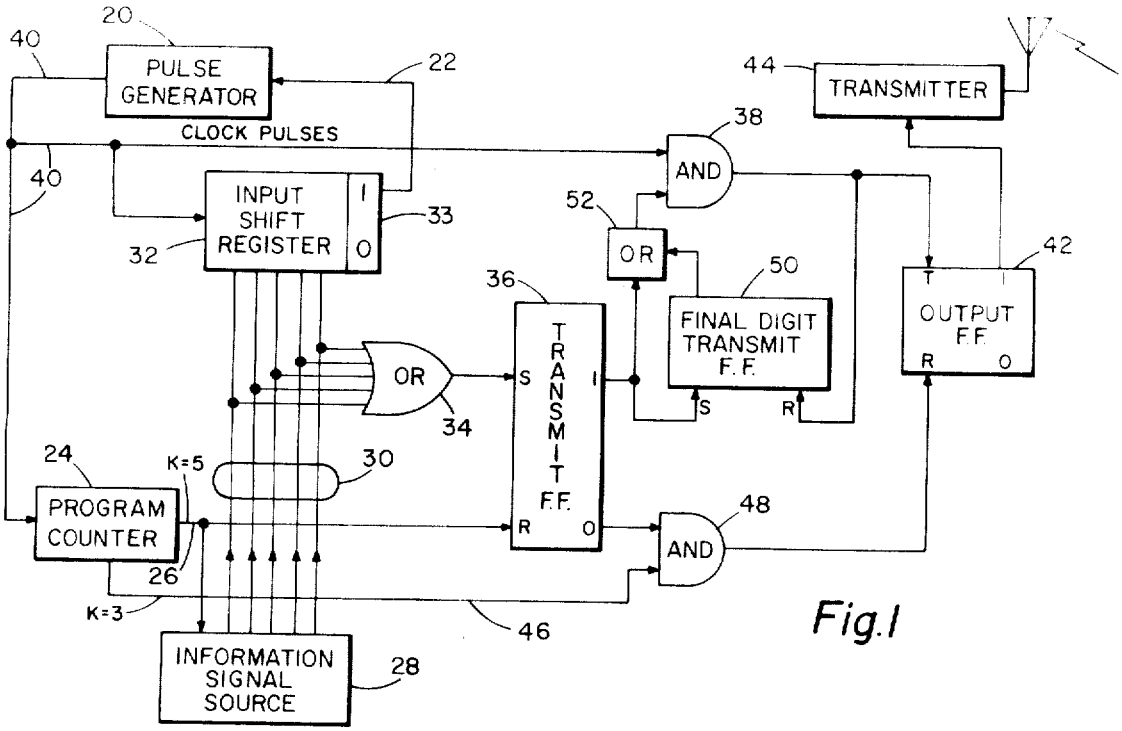
FIG. 1 is a block-flow diagram illustrating an encoder which may be used to provide wave forms according to the teachings of this invention.
Figure 2:
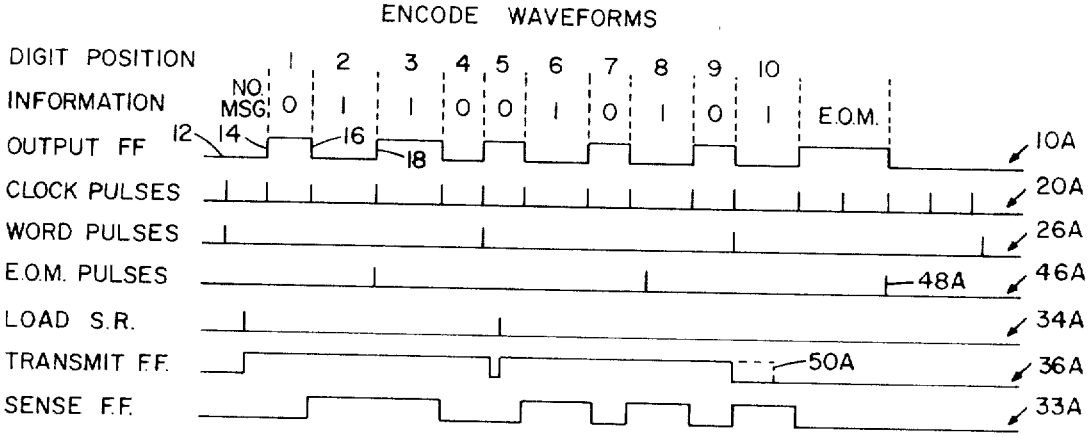
FIG. 2 is a set of idealized wave forms with indicated information representations used to explain the operation of the FIG. 1 encoder.

Paying particular attention now to FIGS. 1 and 2, an encoding system is described for generating communication waves according to the teachings of this invention. Referring firstly to FIG. 2, wave form 10A has an elapsed time of one unit of time, such as one millisecond, between successive transitions 14 and 16 to represent binary zero. Correspondingly, an elapsed time of one and one-half milliseconds between successive transitions 16 and 18 represents a binary 1. The portion 12 appearing before first transition 14 contains no transitions indicating that no information is being transferred over the information channel (not shown). In the illustrated wave form, space-to-mark transition 14 is a first occurring transition and all succeeding transitions, such as 16 and 18, provide both clocking signals and indicate that information is available; i.e., a binary zero or a binary one. For convenience in the embodiment to be described, each message is divided into words. There are five digits of information in each word. Referring to FIG. 2, the first row indicates the digit positions 1 through 10, constituting the two words being transmitted. This short message illustrates how two words are merged into a single succession of transitions to form a unitary message and how the beginning and end of a message is indicated. In a practical case 70–75 bits could be included in a message.

The FIG. 1 encoder includes periodic pulse generator 20 providing a series of clock pulses 20A (FIG. 2). These clock pulses provide the basic timing of the encoding and decoding system. The periodic pulse generator is of the type that has a voltage control connected to line 22 and for altering the periodicity of the generated pulses. In this particular instance, there are provided two period durations or operating states, one having a basic unit of time representing a binary zero (which is one millisecond) and a second period of time which is used to represent a binary one (which is one and one-half milliseconds). Generator 20 supplies its clock pulses continuously to program counter 24. Counter 24 is operative in response to the clock pulses to program the operation of the encoder for transmitting a plurality of bits of information received in five bit word format. In the particular embodiment counter 24 emits a pulse over line 26 each time it has counted five pulses from generator 20 (one for each bit of information). The emitted pulse indicates that a word of five bits of information may be transmitted and may indicate that a unit of five bits has been transmitted. Such pulses 26A are called "word pulses." Information signal source 28 receives a word pulse and is responsive thereto when it has information to be transmitted to provide a set of five signals over the five parallel lines 30 to input shift register 32. The signal transmission over the lines 30 is such that a signal indication according to wave form 34A is always provided through OR circuit 34 to set transmit flip flop 36 to its active condition. This action indicates there are information signals in register 32 for transmission. Flip flop 36 opens certain control gates as will be described to effect the wave generation and resultant transmission.

In one embodiment of the transferring of information signals to register 32, a three-state signal was used wherein there was a center neutral voltage with binary ones and zeros being indicated respectively by signals having plus and minus voltages with respect to said "neutral" voltage. Therefore, OR circuit 34 would always pass either a plus or minus signal to set flip flop 36. Alternatively, lines 30 may operate in a two-state mode with an M or N code providing M binary one signals from an N bit word through OR circuit 34 for setting transmit flip flop 36. Further, if a straight binary code is used, a control line (not shown) may be connected between information source 28 and the set input of flip flop 36 for setting that flip flop each time information is transferred to input shift register 32. For example, pure binary information as illustrated in FIG. 2 may be used. Such binary information may actually be NRZ1 encoded information wherein a binary zero indicates no change in state; i.e., no information change, while a binary one indicates a change in state, therefore indicating that the binary information represented is being changed. Other binary codes may be used such as binary coded decimal, excess three, etc., the selection of such coding is not important to practicing the present invention.

Transmit flip flop 36 initiates the operation by supplying wave 26A of FIG. 2 to open AND gate 38 for passing clock pulses appearing on line 40 supplied by generator 20. Each time AND gate 38 passes such a clock pulse, output flip flop 42 is switched to its other state irrespective of the present state, (hereinafter referred to as "toggling") for providing the output flip flop wave form 10A. Transmitter 44 sends wave 10A to an information channel (not shown). As will become apparent, flip flop 42 is initially cleared or reset to its zero indicating state as represented by portion 12 of wave form 10A.

The generation of the first space-to-mark transition 14 will now be described. Clock pulses from generator 20 continuously shift the signal contents of shift register (SR)32. Shift register 32 has five digit positions plus a sensing digit position 33 which supplies a frequency control voltage over line 22 to generator 20. Initially, the shift register 32 is loaded by the load SR-pulse 34A after a word pulse 26A. The next occurring clock pulse is one millisecond later and is simultaneously passed by AND gate 38 to toggle flip flop 42 creating transition 14 and shifts the signal contents of register 32 one digit position to the right inserting the binary zero contained in digit position one (FIG. 2) into sense flip flop 33. Since it is a zero, the clock pulse generator 20 still operates on a one millisecond period. Also, the clock pulse advances program counter 24 one count.

The second transition 16 (mark-to-space) is initiated by the clock pulse occurring at the end of digit position one. AND circuit 38 passes the second occurring clock pulse to toggle flip flop 42 back to its cleared or reset state, generating transition 16. Simultaneously therewith, counter 24 has increased its count to two (binary 010) and shift register 32 is shifted right one digit position inserting the binary one representing signal of digit position two in sensing flip flop 33. Immediately, the voltage over line 22 is altered to increase the period of generator 20 to one and one half milliseconds. Therefore, transition 18 occurs one and one-half milliseconds later than transition 16.

The third transition 18 (space-to-mark) is generated as aforedescribed with the clock pulses also shifting register 32 to insert the third digit position contained binary one signal into flip flop 33 and advance counter 24 to a count of three. Upon reaching the count of three, a pulse is emitted by counter 24 over line 46 which is used as will be later described to indicate end-of-message (EOM). AND gate 48 is closed by transmit flip flop 36 being in a set state and therefore blocks the emitted pulse one line 46. Flip flop 33 has received the binary 1 in from the third digit position, therefore the elapsed time until the next transition following transition 18 is also one and one-half milliseconds. The fourth transition, immediately following digit position three, is generated as the aforedescribed with the counter 24 now having a count of four and a binary zero signal being shifted into flip flop 33 for decreasing the period of generator 20.

The fifth occuring transition may indicate the end of a message. However, it is desired to transmit digits 6–10, therefore the EOM signal must be blocked. Counter 24 has been advanced to a count of five emitting a pulse over line 26 indicating to information signal source 28 that information signals may again be inserted into shift register 32. It may be noted that line 26 world pulse 26A resets transmit flip flop 36 disabling or closing AND gate 38 inhibiting transmission of clock pulses from line 40 to toggle output flip flop 42. To complete the message, another transition at the end of digit position 5 must be provided for. However, in this particular illustration, information signal source 28 provides a second set of five information pulses or signals to shift register 32 to set flip flop 36 before the occurrence of the next succeeding clock pulse. Such resetting and subsequent setting of flip flop 36 is indicated by the negative going portion of wave 36A in digit portion 5 of FIG. 2. Flip flop 36 having been set before the clock pulse occurring at the end of the digit position five, the transitions of the sixth, seventh and eighth digit positions are supplied as aforedescribed for earlier occurring transistors.

The procedure for indicating end-of-message (EOM) is initiated at the end of digit position nine (digit position 4 in the second word) by word pulse 26A. Transmit flip flop 36 is reset to its inactive condition closing AND gate 38 preventing clock pulses from line 40 from toggling output flip flop 42. Word pulse 26A is also sent to information signal source 28 which in this case does not respond permitting EOM to be generated. Since AND circuit 38 is closed, provisions are made to supply the last transition appearing at the termination of digit position 10. To this end, final-digit transmit flip flop 50 and OR gate 52 are provided. As soon as transmit flip flop 36 has been set, its set output signal is supplied to the set input of flip flop 50, setting it to an active condition. Flip flop 50 provides an output signal to OR circuit 52 which is combined with the set output signal from flip flop 36 to open AND gate 38. Flip flop 50 has the output signal of AND gate 38 connected to its reset input. Therefore, each time flip flop 42 is toggled, flip flop 50 receives an impulse on its reset input. However, transmit flip flop 36 is continuously driving the flip flop 50 set input keeping it set. Because of the inherent delays through the counter 24, word pulse 26A does not reset transmit flip flop 36 until after AND gate 38 has passed its clock pulse from line 40. Flip flop 50 is reset by AND gate 38 output pulse just prior to the time transmit flip flop 36 is reset. Therefore, flip flop 50 is still receiving the set signal from flip flop 36, keeping flip flop 50 in the set condition until the next appearing clock pulse. Such action is indicated by dotted line 50A in FIG. 2. On the last transition at the end of digit period 10, AND circuit 38 is enabled or opened by final digit transmit flip flop 50 and is automatically reset by the pulse output of AND circuit 38.

The end of message (EOM) indication is completed in two milliseconds by program counter 24 emitting a second pulse over line 46. In FIG. 2, EOM pulse 48A is passed by AND circuit 48, now opened by transmit flip flop 36 in its reset state, which clears flip flop 42 two clock pulse periods after the final transition of digit period 10. Sense flip flop 33 is reset causing generator 20 to operate on a one millisecond period. It will be remembered that word pulse 26A (first occurring pulse in EOM) occurred at the end of digit period nine and that three clock pulse periods (counter 24 advanced by three) thereafter, the pulse is emitted over line 46. Since digit period or position 10 takes up one of the three digit periods, the end of message indication is provided by an elapsed time of two clock pulse or digit periods between the transition at the end of digit period 10 and the transition caused by pulse 48A.

Figure 5:
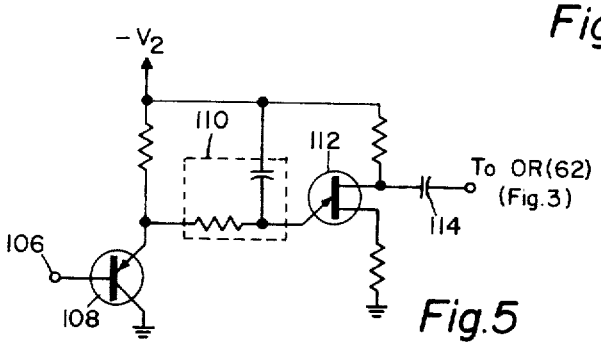
FIG. 5 is a schematic diagram of a delayed pulse generator usable with the FIG. 3 decoder.
Figure 3:
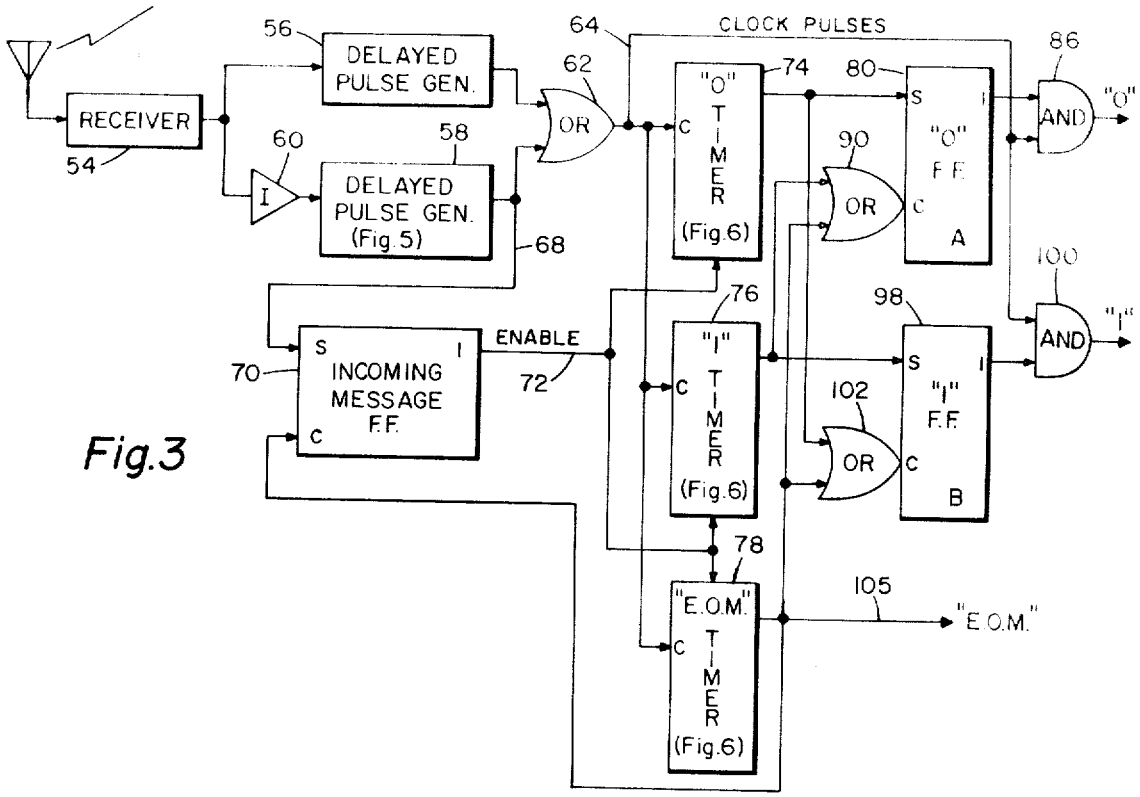
FIG. 3 is a block flow diagram of a receiver-decoder usable with the subject invention.
Figure 4:
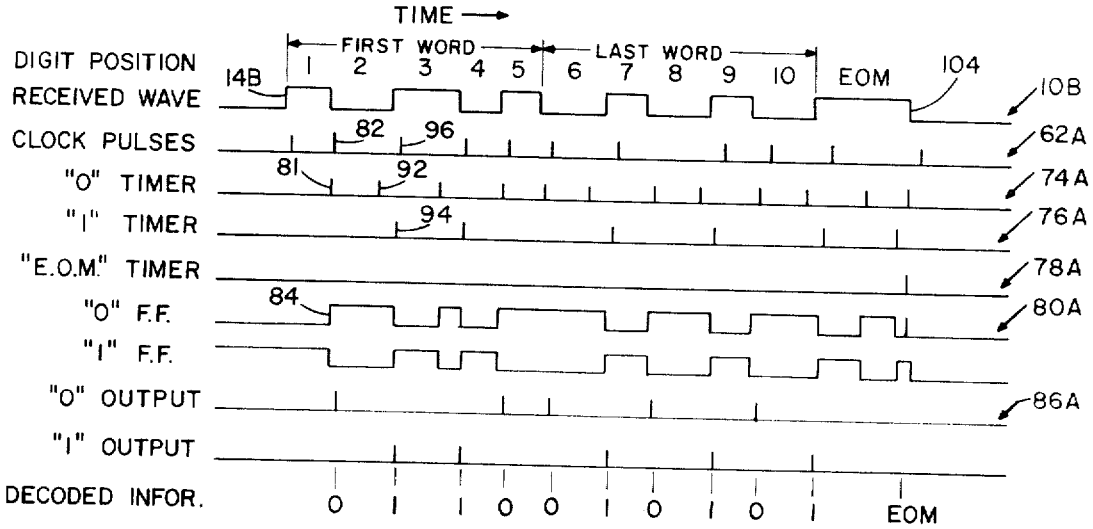
FIG. 4 is a set of idealized wave forms used to explain the operation of the FIG. 3 decoder.

Referring now to FIGS. 3 and 4 and an exemplary decoding operation utilizing the teachings of this invention is described. In FIG. 4, received wave 10B is identical to the output wave 10A of FIG. 2, as just described. Wave 10B is received by two-state receiver 54, which may be any known form of communication receiver. Wave 10B is then supplied to delayed-pulse generators 56 and 58 for detecting the transitions. Delayed pulse generator 56 detects and indicates the mark-to-space transitions. It will be remembered that the "no-message condition" of waves 10A and 10B are at the "space" potential, as indicated by numeral 12 in FIG. 2. The delayed pulse generator construction is shown in FIG. 5 and will be later described. To make both the generators 56 and 58 identical, inverting amplifiers 60 is inserted in the input portion of the generator 58 to invert the direction of transition, the purpose of which will be come apparent. Generators 56 and 58 combine their output pulses in OR circuit 62 to provide a series of clock pulses 62A over line 64 for timing the operation of the decoding system. By comparing clock pulses 62A with clock pulses 20A of FIG. 2, it may be noted that after the first transition of waves 10A and 10B, the spacing between the clock pulses in the decoder is identical to that in the encoder.

The detection of the first transition in a word of wave 10B is always detected by generator 58 because the first transition is always a space-to-mark transition. Generator 58 supplies a pulse over line 68, indicative of such transition, setting incoming-message flip flop 70. Flip flop 70 supplies its set condition indication as an enabling voltage over line 72 for activating the three timers 74, 76 and 78 which are used respectively for timing the elapsed time between successive transitions for detecting a binary zero, binary one, and EOM. The construction of such timers is illustrated in schematic form in FIG. 6 and will be later fully described. The characteristics of the three timers are identical in that after being reset by a clock pulse appearing on line 64, each of the timers will emit a pulse after a predetermined elapsed time. For example, timer 74 will emit a pulse after one millisecond, indicating a binary zero; timer 76 emits a pulse after one and one-half milliseconds, indicating a binary one; and EOM timer 78 emits a pulse two milliseconds after being reset, indicating end-of-message. Each time a clock pulse appears on line 64, all three timers are simultaneously reset.

Detection of a binary zero as indicated by an elapsed time of one millisecond will be first described. For purposes of discussion, the first binary zero appearing in digit position will be utilized. The first clock pulse in wave 62A is generated from the first transition 14B (wave 10B). The clock pulse appears at a time subsequent to transition 14B. Generators 56 and 58 are constructed not to emit a pulse until a certain energy level has been received. Such an energy threshold eliminates random noise in the channel from introducing false information into the system. The first appearing clock pulse also resets timer 74 causing it to begin its timing operation. After a time just short of one millisecond, a pulse 81 in a string of pulses 74A is emitted to set zero indicating flip flop 80. Zero flip flop 80 supplies an output pulse 80A to AND circuit 86, the setting operation being indicated by the rising wave front 84 in wave 80A. Immediately subsequent to timer 74 emitted pulse 81, second occurring clock pulse 82 is emitted by generator 56 as caused by the second appearing transition at the end of digit period number one. Such clock pulse is provided over line 64 and through AND circuit 86, opened by flip flop 80 to indicate a zero binary digit indicating signal has been received. It should also be noted that the second clock pulse 82 resets timers 76 and 78 to restart the timing operation without their having emitted any pulses.

Detection of a binary one indicating elapsed time will now be described. For purposes of illustration, the second digit position, having a binary one, will be discussed. It will be remembered that flip flop 80 has been set. Whenever timer 76 emits a pulse indicating a binary one, it is supplied to OR circuit 90 to reset flip flop 80 for closing AND circuit 86. In the second digit position, zero timer 74 emits pulse 92 of series of pulses 74A setting flip flop 80. Subsequent thereto, "one" timer 76 emits pulse 94 resetting flip flop 80 and simultaneously setting flip flop 98 just prior to the initiation of clock pulse 96 of clock pulses 62A as emitted by generator 58. Clock pulse 96 is supplied to AND circuits 86 and 100 and is passed through AND circuit 100 as opened by flip flop 98 to indicate a received binary one signal. Flip flop 98 is reset by the signals through OR circuit 102 as received from timers 74 and 78. Therefore, the two flip flops, 80 and 98, are respectively reset each time either timers 74 or 76 indicate information may be received other than that indicated by such flip flops. Subsequent digit positions are detected as aforedescribed. In transition from the first to the succeeding words, the decoder does not see any difference and operates as described.

Detection of the end-of-message (EOM) will now be described. Subsequent to the receipt of the transition at the end of digit period 10, timers 74 and 76 emit several pulses as indicated in FIG. 4. These are ineffective because no clock pulses 62A are generated during this interim period. Just prior to the final transition 104 of wave 10B, EOM timer 78 emits pulse 78A resetting flip flops 80 and 98 for preventing any spurious information indication. EOM timer 78 pulse 78A is also supplied to reset incoming message flip flop 70 disabling all three timers 74, 76 and 78. Simultaneously therewith there is provided over line 105, a decode signal to apparatus (not shown) utilizing the received information. Such a device may be a digital computer. When the last appearing clock pulse 62A, as caused by transition 104, appears on line 64, both AND gates 86 and 100 are close and the timers 74, 76 and 78 have been disabled. The decoder is now ready to receive additional messages.

Referring now to FIG. 5, there is shown a schematic diagram of circuitry which may be used to implement the delayed-pulse generators 56 and 58 of FIG. 3. Generator 56 responds to space-to-mark transition while generator 58 responds to mark-to-space. Received wave 10B is supplied to the generator on terminal 106 for selectively turning transistor switch 108 on and off according to the polarity of the received wave. Initially, all the voltage points in the circuit were $-V_2$ volts because transistor 108 is non-conductive. When transistor 108 is conductive, RC circuit 110 is charged positively by current flow from ground. After a predetermined time, the voltage across RC circuit 110 is sufficient to switch unijunction transistor 112 to current conduction. Upon being switched on, unijunction transistor 112 provides a voltage surge which is coupled through coupling capacitor 114 as an impulse (a clock pulse) to OR circuit 62. Therefore, the FIG. 5 circuit emits a pulse each time transistor 108 is turned on, that is each time the received wave 10B goes negative. In this regard, inverting amplifier 60 inverts the received wave such that the first transition 14B (which goes positive) is inverted to be a negative going transition for actuating generator 58 only in response to positive going transitions. RC circuit 110 is an integrator for detecting the amount of energy received after a transition. Such an integrator requires a strong signal to actuate unijunction transistor 112 to eliminate noise spikes commonly found in communications channels. Resistor of RC network 110 is low value such that unijunction transistor 112 becomes conductive and does not oscillate. It remains conductive until transistor 108 is turned off.

Figure 6:
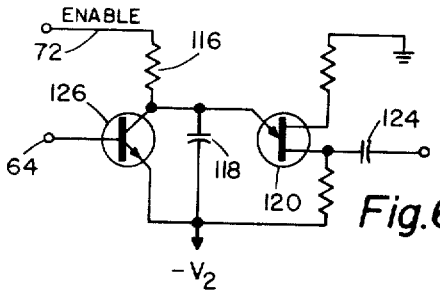
FIG. 6 is a schematic diagram of a unijunction type of timing unit usable with the FIG. 3 illustrated decoder.

Referring now to FIG. 6, there is shown in schematic form, a timer which may be used to implement timers 74, 76 and 78. The enable signal from flip flop 70 (FIG. 3) is supplied over line 72 through resistor 116 to charge capacitor 118. As capacitor 118 is charged positively with respect to ground reference potential, unijunction transistor 120 is actuated after a delay determined by the RC time constant of capacitor 118 and resistor 116 into repeated current conductions for providing current surges through resistor 122. The current surge is translated into a voltage pulse by coupling capacitor 124 and is provided to the elements described with respect to the respective timers of FIG. 3. By adjusting the time constant of resistor 116 and capacitor 118, different time delays are provided in the decoder timers. Clock pulses 62A as supplied over line 64 reset the timers by actuating transistors switch 126 to current conduction. When conductive, transistor 126 presents practically zero impedance to capacitor 118 for discharging it very rapidly to reset the timing circuit.

What is claimed is:

1. A digital signal decoder, including in combination:

input means for receiving a signal wave characterized by a succession of transitions between first and second states, the elapsed time between successive transitions varying between first and second intervals based upon digital information content, enabling means connected to said input means for providing an enabling signal upon the receipt of the first transition of the digital signal, first timing means coupled to said input means for initiating a first timing operation and generating a signal indicative of a first period of elapsed time between successive transitions, second timing means coupled to said input means for initiating a second timing operation and generate a signal indicative of a second period of elapsed time between successive transitions, said first and second timing means being coupled to said enabling means whereby the first [receiving] *received* transition enables said timing means, and output means connected to receive the output signals of said first and second timing circuits and generate a binary information signal in accordance with the timing means signals.

2. The combination of claim 1 further comprising, third timing means coupled to said input means for initiating a third timing operation in response to the receipt of successive transitions having a prescribed elapsed time period, said third timing means providing an output signal indicating the end of the digital signal.

*3. A digital signal decoder including in combination:*

*input means for receiving a signal wave characterized by a succession of transitions between first and second states, the elapsed time between successive transitions varying between first and second intervals based upon digital information content;*

*timing means connected to said input means and responsive to the signal wave for producing a first output signal indicative of a first interval of elapsed time between successive transitions and for producing a second output signal indicative of a second interval of elapsed time between successive transitions; and*

*output means connected to said input means and to said timing means to receive the first and second output signals therefrom and responsive to the signal wave and such output signals for generating a binary information signal in accordance therewith.*

*4. The combination according to claim 3 further including means coupled with said input means and responsive to each transition in the received signal wave for resetting said timing means upon the occurrence of each received transition.*

*5. The combination according to claim 4 wherein said output means includes first and second gating means enabled, respectively, by the first and second output signals of said timing means, with said first and second gating means also being coupled with said input means, said first gating means providing an output signal in response to a transition in the received signal wave whenever said first gating means is enabled by the first output signal from said timing means, said second gating means pro-*

*viding an output signal in response to a transition in the received signal wave whenever said second gating means is enabled by the second output signal from said timing means.*

*6. A binary digital transmission system including in combination:*

*means providing binary information data bits having at least one output with a signal having a first level appearing thereon for binary data bits of one binary condition and a signal having a second level appearing thereon for binary data bits of another condition;*

*interval timing means coupled with the output of said means providing data bits and responsive to the signals appearing thereon for producing output pulses at first and second time intervals in response to the first and second signal levels respectively, appearing on the output of the source of data bits;*

*circuit means coupled with said timing means and responsive to the output pulses for providing a binary output signal characterized by a succession of transitions between first and second states, each transition occurring each time an output pulse is obtained from the timing means, the elapsed time between successive transitions varying between said first and second time intervals;*

*further timing means coupled to receive the binary output signal from said circuit means for producing a first output signal indicative of a first interval of elapsed time between successive transitions and for producing a second output signal indicative of a second interval of elapsed time between successive transitions; and*

*output means connected to receive the first and second output signals from said further timing means for generating a binary information signal in accordance with the output signals from said further timing means.*

References Cited

The following references, cited by the Examiner, are of record in the patented file of this patent or the original patent.

UNITED STATES PATENTS

| | | | |
|---|---|---|---|
| 3,319,013 | 5/1967 | Hodder | 179—100.2 |
| 3,319,013 | 5/1967 | Hadder | 179—100.2 |

ALBERT J. MAYER, Primary Examiner

U.S. Cl. X.R.

178—66, 88; 243—203; 325—30, 38 R, 142; 332—9 R; 340—347